US008226467B2

(12) United States Patent
Weber et al.

(10) Patent No.: US 8,226,467 B2
(45) Date of Patent: Jul. 24, 2012

(54) GAMING SYSTEM AND METHOD ENABLING PLAYER PARTICIPATION IN SELECTION OF SEED FOR RANDOM NUMBER GENERATOR

(75) Inventors: Reid M. Weber, Reno, NV (US); Michael M. Oberberger, Reno, NV (US)

(73) Assignee: IGT, Reno, NV (US)

( * ) Notice: Subject to any disclaimer, the term of this patent is extended or adjusted under 35 U.S.C. 154(b) by 905 days.

(21) Appl. No.: 12/269,372

(22) Filed: Nov. 12, 2008

(65) Prior Publication Data

US 2010/0120497 A1 May 13, 2010

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................... 463/20; 463/16; 463/21

(58) Field of Classification Search .................... 463/20; 708/250

See application file for complete search history.

(56) References Cited

U.S. PATENT DOCUMENTS

| | | | |
|---|---|---|---|
| 4,157,829 | A | 6/1979 | Goldman et al. |
| 4,277,064 | A | 7/1981 | Newman |
| 4,448,419 | A | 5/1984 | Telnaes |
| 4,494,197 | A | 1/1985 | Troy et al. |
| 4,499,551 | A | 2/1985 | Frank |
| 4,527,798 | A | 7/1985 | Siekierski et al. |
| 4,582,324 | A | 4/1986 | Koza et al. |
| 4,624,459 | A | 11/1986 | Kaufman |
| 4,652,998 | A | 3/1987 | Koza et al. |
| 4,669,730 | A | 6/1987 | Small |
| 4,679,143 | A | 7/1987 | Hagiwara |
| 4,689,742 | A | 8/1987 | Troy et al. |
| 4,694,412 | A | 9/1987 | Domenik et al. |
| 4,711,451 | A | 12/1987 | Pajak et al. |
| 4,713,787 | A | 12/1987 | Rapp |
| 4,791,594 | A | 12/1988 | Harney et al. |
| 4,817,951 | A | 4/1989 | Crouch et al. |
| 4,842,278 | A | 6/1989 | Markowicz |
| 4,982,337 | A | 1/1991 | Burr et al. |
| 5,042,809 | A | 8/1991 | Richardson |
| 5,092,598 | A | 3/1992 | Kamille |
| 5,100,139 | A | 3/1992 | Di Bella |
| 5,158,293 | A | 10/1992 | Mullins |

(Continued)

FOREIGN PATENT DOCUMENTS

| | | |
|---|---|---|
| EP | 0829834 | 3/1998 |
| WO | WO/2004-077234 | 9/2004 |
| WO | WO/2004-077238 | 9/2004 |
| WO | WO/2004-081714 | 9/2004 |
| WO | WO/2006-007481 | 1/2006 |

* cited by examiner

*Primary Examiner* — Dmitry Suhol
*Assistant Examiner* — Kevin Y Kim
(74) *Attorney, Agent, or Firm* — Neal, Gerber & Eisenberg LLP

(57) ABSTRACT

A gaming system which utilizes a random number generator where the process of selecting one or more seeds for the random number generator includes participation of a player. In one embodiment, the player picks one of a plurality of displayed selections at a gaming device. Each selection is associated with a different external seeding source of data not controlled by the gaming system. A gaming system gathers the data from the external seeding sources associated with the different seeds. The gaming system uses the data gathered from the seeding source associated with the player's picked selection to determine one or more seeds. The determined seeds are used to initialize a random number generator, which generates one or more numbers and at least in part determine the outcome of the game.

32 Claims, 13 Drawing Sheets

U.S. PATENT DOCUMENTS 5,199,710 A 4/1993 Lamle
5,251,165 A 10/1993 James, III
5,258,936 A 11/1993 Gallup et al.
5,265,874 A 11/1993 Dickinson et al.
5,282,620 A 2/1994 Keesee
5,324,035 A 6/1994 Morris et al.
5,327,365 A 7/1994 Fujisaki et al.
5,383,143 A 1/1995 Crouch et al.
5,407,199 A 4/1995 Gumina
5,416,783 A * 5/1995 Broseghini et al. ........... 714/728
5,463,689 A 10/1995 Schutte et al.
5,511,784 A 4/1996 Furry et al.
5,562,284 A 10/1996 Stevens
5,586,937 A 12/1996 Menashe
5,588,913 A 12/1996 Hecht
5,602,845 A 2/1997 Wahl
5,628,684 A 5/1997 Bouedec
5,779,545 A 7/1998 Berg et al.
5,871,398 A 2/1999 Schneier et al.
5,871,400 A 2/1999 Yfantis
5,910,956 A * 6/1999 Guthrie et al. ................ 370/445
5,944,606 A 8/1999 Gerow
5,949,042 A 9/1999 Dietz, II et al.
5,966,313 A 10/1999 Sakamoto
5,967,893 A 10/1999 Lawrence et al.
5,970,143 A 10/1999 Schneier et al.
6,017,032 A 1/2000 Grippo et al.
6,024,640 A 2/2000 Walker et al.
6,053,813 A 4/2000 Mathis
6,079,711 A 6/2000 Wei et al.
6,099,408 A 8/2000 Schneier et al.
6,117,009 A 9/2000 Yoseloff
6,159,096 A 12/2000 Yoseloff
6,183,361 B1 2/2001 Cummings et al.
6,193,607 B1 2/2001 Kay
6,210,275 B1 4/2001 Olsen
6,210,276 B1 4/2001 Mullins
6,220,961 B1 4/2001 Keane et al.
6,241,606 B1 6/2001 Riendeau et al.
6,250,685 B1 6/2001 Walker et al.
6,254,480 B1 7/2001 Zach
6,272,223 B1 8/2001 Carlson
6,309,298 B1 10/2001 Gerow
6,311,976 B1 11/2001 Yoseloff et al.
6,331,143 B1 12/2001 Yoseloff
6,358,151 B1 3/2002 Enzminger et al.
6,368,218 B2 4/2002 Angell, Jr.
6,402,614 B1 6/2002 Schneier et al.
6,419,583 B1 7/2002 Crumby et al.
6,428,413 B1 8/2002 Carlson
6,443,837 B1 9/2002 Jaffe et al.
6,443,838 B1 9/2002 Jaimet
6,447,395 B1 9/2002 Stevens
6,471,591 B1 10/2002 Crumby
6,502,116 B1 12/2002 Kelly et al.
6,524,184 B1 2/2003 Lind et al.
6,533,664 B1 * 3/2003 Crumby .......................... 463/42
6,537,150 B1 3/2003 Luciano et al.
6,567,924 B1 5/2003 McGee et al.
6,569,016 B1 5/2003 Baerlocher
6,656,044 B1 12/2003 Lewis
6,666,766 B2 12/2003 Baerlocher et al.
6,678,707 B1 1/2004 Butler
6,688,977 B1 2/2004 Baerlocher et al.
6,728,740 B2 4/2004 Kelly et al.
6,729,961 B1 5/2004 Millerschone
6,749,500 B1 6/2004 Nelson et al.
6,776,711 B1 8/2004 Baerlocher
6,780,110 B2 8/2004 Baerlocher et al.
6,790,143 B2 9/2004 Crumby
6,792,438 B1 9/2004 Wells et al.
6,793,578 B2 9/2004 Luccesi et al.
6,796,901 B2 9/2004 Baerlocher
6,796,902 B2 9/2004 Baerlocher et al.
6,800,026 B2 10/2004 Cannon
6,829,628 B2 12/2004 Kim
6,857,961 B2 2/2005 Soltys et al.
6,866,584 B2 3/2005 Michaelson
6,910,962 B2 6/2005 Marks et al.
6,964,612 B2 11/2005 Soltys et al.
6,966,834 B1 11/2005 Johnson
6,988,946 B2 1/2006 Michaelson et al.
7,001,278 B2 2/2006 Maya et al.
7,011,309 B2 3/2006 Soltys et al.
7,082,449 B2 7/2006 Rarick
7,136,889 B1 11/2006 Schreck
7,160,190 B2 1/2007 Baerlocher et al.
7,169,044 B2 1/2007 Baerlocher et al.
7,170,997 B2 1/2007 Petersen et al.
7,192,348 B2 3/2007 Brosnan et al.
7,201,657 B2 4/2007 Baerlocher et al.
7,203,841 B2 4/2007 Jackson et al.
7,222,852 B2 5/2007 Soltys et al.
7,235,009 B2 6/2007 Baerlocher
7,291,069 B2 11/2007 Michaelson et al.
7,316,613 B2 1/2008 Luccesi et al.
7,316,615 B2 1/2008 Soltys et al.
7,329,183 B2 2/2008 Michaelson et al.
7,331,865 B2 2/2008 Baerlocher et al.
7,341,513 B2 3/2008 Cuddy et al.
7,357,713 B2 4/2008 Marks et al.
7,363,567 B2 4/2008 Rands
7,371,166 B1 5/2008 Webb et al.
7,379,955 B1 5/2008 Kuehnel et al.
7,387,568 B2 6/2008 Millerschone
7,390,256 B2 6/2008 Soltys et al.
7,399,227 B2 7/2008 Michaelson et al.
7,412,468 B2 8/2008 Butler
7,448,626 B2 11/2008 Fleckenstein
7,470,182 B2 12/2008 Martinek et al.
7,473,176 B2 1/2009 Michaelson
7,479,062 B2 1/2009 Michaelson
7,481,709 B2 1/2009 Bussick et al.
8,016,662 B1 * 9/2011 Hamman et al. ................ 463/22
2002/0039917 A1 4/2002 Armstrong et al.
2002/0040347 A1 4/2002 Murakami et al.
2002/0072404 A1 6/2002 Gerow
2002/0082070 A1 6/2002 Macke et al.
2002/0098882 A1 7/2002 Lind et al.
2002/0111214 A1 8/2002 Lind et al.
2002/0113369 A1 8/2002 Weingardt
2002/0169018 A1 11/2002 Schneier et al.
2003/0130029 A1 7/2003 Crumby
2003/0193136 A1 10/2003 Walker et al.
2004/0002376 A1 1/2004 Swift et al.
2004/0102242 A1 * 5/2004 Poelmann ....................... 463/22
2004/0116174 A1 6/2004 Baerlocher et al.
2004/0152507 A1 8/2004 Baerlocher et al.
2004/0166921 A1 * 8/2004 Michaelson .................... 463/20
2004/0166923 A1 8/2004 Michaelson et al.
2004/0176167 A1 9/2004 Michaelson et al.
2004/0235559 A1 11/2004 Brosnan et al.
2004/0259629 A1 12/2004 Michaelson et al.
2005/0137012 A1 6/2005 Michaelson
2005/0143170 A1 6/2005 Maya et al.
2006/0025210 A1 2/2006 Johnson
2006/0030387 A1 2/2006 Jackson
2006/0073874 A1 4/2006 Cregan et al.
2006/0094509 A1 5/2006 Michaelson et al.
2008/0076527 A1 3/2007 Low et al.
2007/0149270 A1 6/2007 Baerlocher et al.
2007/0155464 A1 7/2007 Baerlocher et al.
2007/0155480 A1 7/2007 Brosnan et al.
2008/0026824 A1 1/2008 Muir
2008/0045302 A1 2/2008 Low
2008/0051169 A1 2/2008 Michaelson et al.
2008/0090655 A1 4/2008 Marks et al.
2008/0102931 A1 5/2008 Marks et al.
2008/0113763 A1 5/2008 Michaelson et al.
2008/0200242 A1 8/2008 Ginsberg et al.
2008/0234021 A1 9/2008 Palmer et al.
2008/0263117 A1 * 10/2008 Rose et al. .................... 708/254
2008/0268935 A1 10/2008 Acres
2010/0002877 A1 * 1/2010 Zhang ............................ 380/46

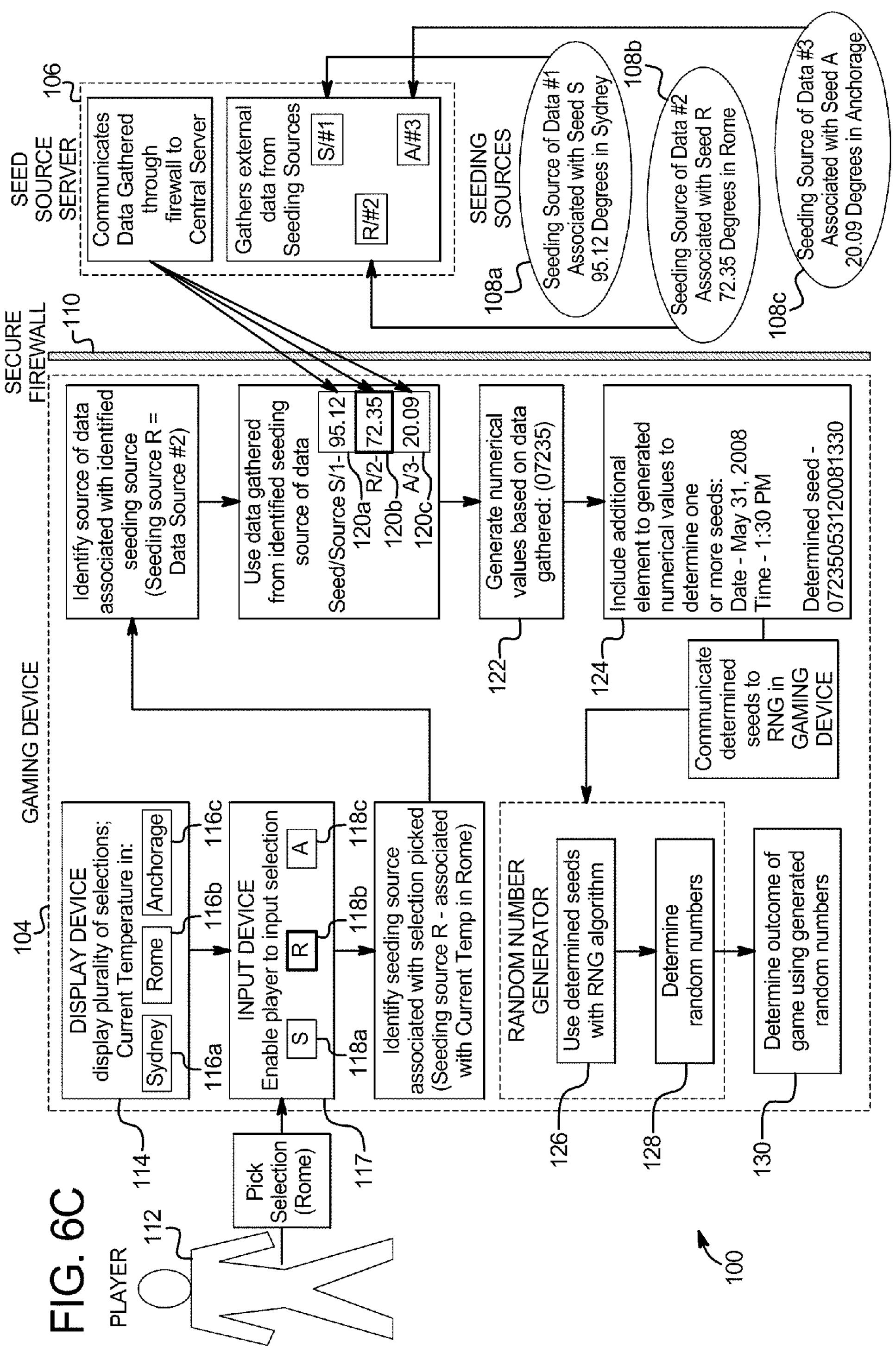

FIG. 6C
PLAYER
112
Pick Selection (Rome)
114
117
104
DISPLAY DEVICE display plurality of selections; Current Temperature in:
Sydney
Rome
Anchorage
116a
116b
116c
INPUT DEVICE Enable player to input selection
S
R
A
118a
118b
118c
Identify seeding source associated with selection picked (Seeding source R - associated with Current Temp in Rome)
GAMING DEVICE
RANDOM NUMBER GENERATOR
Use determined seeds with RNG algorithm
Determine random numbers
Determine outcome of game using generated random numbers
126
128
130
100
Identify source of data associated with identified seeding source (Seeding source R = Data Source #2)
Use data gathered from identified seeding source of data
Seed/Source S/1- 95.12
R/2- 72.35
A/3- 20.09
120a
120b
120c
Generate numerical values based on data gathered: (07235)
122
Include additional element to generated numerical values to determine one or more seeds: Date - May 31, 2008 Time - 1:30 PM
Determined seed - 0723505312008l330
124
Communicate determined seeds to RNG in GAMING DEVICE
SECURE FIREWALL
110
SEED SOURCE SERVER
106
Communicates Data Gathered through firewall to Central Server
Gathers external data from Seeding Sources
S/#1
R/#2
A/#3
SEEDING SOURCES
108a
Seeding Source of Data #1 Associated with Seed S 95.12 Degrees in Sydney
108b
Seeding Source of Data #2 Associated with Seed R 72.35 Degrees in Rome
108c
Seeding Source of Data #3 Associated with Seed A 20.09 Degrees in Anchorage

FIG. 9

| Capitol | Country | Current Temp | Capitol | Country | Current Temp |
|---|---|---|---|---|---|
| Abuja | Nigeria | 16.4 | Libreville | Gabon | 92.3 |
| Accra | Ghana | 48.9 | Lilongwe | Malawi | 34.7 |
| Addis Ababa | Ethiopia | 67.9 | Mbabane | Swaziland | 63.5 |
| Al Jaza'ir | Algeria | 81.5 | Lobamba | Swaziland | 55.4 |
| Antananarivo | Madagascar | 23.9 | Lome | Togo | 64.3 |
| Asmara | Eritrea | 97.5 | Luanda | Angola | 11.3 |
| Bamako | Mali | 20.4 | Lusaka | Zambia | 63.0 |
| Bangui | Central Africa | 29.2 | Malabo | Equatorial Guinea | 44.0 |
| Banjul | Gambia | 74.8 | Maputo | Mozambique | 81.8 |
| Bissau | Guinea-Bissau | 17.7 | Maseru | Lesotho | 58.9 |
| Brazzaville | Congo | 24.8 | Mogadishu | Somalia | 34.9 |
| Bujumbura | Burundi | 58.7 | Monrovia | Liberia | 75.5 |
| Cairo | Egypt | 56.3 | Moroni | Comoros | 23.9 |
| Pretoria | South Africa | 22.6 | Nairobi | Kenya | 56.3 |
| Cape Town | South Africa | 37.4 | N'Djamena | Chad | 5.8 |
| Bloemfontein | South Africa | 90.9 | Niamey | Niger | 26.0 |
| Conarky | Guinea-Bissau | 8.0 | Nouakchott | Mauritania | 51.9 |
| Dakar | Senegal | 96.8 | Ouagadougou | Burkina Faso | 43.1 |
| Dar es Salaam | Tanzania | 39.8 | Port Louis | Mauritius | 33.0 |
| Djibouti | Djibouti | 8.9 | Porto-Novo | Benin | 10.6 |
| Freetown | Sierra Leone | 45.4 | Cotonou | Benin | 71.6 |
| Gaborone | Botswana | 39.3 | Praia | Cape Verde | 56.4 |
| Harare | Zimbabwe | 33.2 | Rabat | Morocco | 30.2 |
| Kampala | Uganda | 57.1 | Tripoli | Libya | 0.7 |
| Khartoum | Sudan | 52.3 | Tunis | Tunisia | 22.0 |
| Kigali | Rwanda | 6.7 | Victoria | Seychelles | 45.6 |
| Kinshasa | Congo | 13.5 | Windhoek | Nambia | 47.9 |
| La 'Youn | Western Sahara | 75.0 | Yamoussoukro | Cote d'Ivoire | 87.0 |
| | | | Yaounde | Cameroon | 41.6 |

GAMING SYSTEM AND METHOD ENABLING PLAYER PARTICIPATION IN SELECTION OF SEED FOR RANDOM NUMBER GENERATOR

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Known gaming machines use random number generators to randomly determine the outcomes of wagering games. Random number generators in electronic gaming systems typically use a seed to begin generation of one or more random numbers (i.e., the output of a random number generator). The seed can be any number. For instance, a seed can be the date and time of day represented by a numeral (e.g., May 31, 2008, 1:30 PM can be: 053120081330).

The random number generator uses the seed as an input for the random number generator algorithm to produce the random numbers. Random number generator algorithms are typically static (i.e., they do not change). Thus, if two identical seeds are input into a random number generator at two different times, the random numbers generated by the random number generator will be the same. For example, if two different gaming devices with the same random number generating algorithms were to also use the same seed value, the random number generated, as well as the outcome of the game, would be identical for both gaming devices. Therefore, the seed introduced to or used by the random number generator algorithm in a sense determines the extent to which the random numbers generated are random.

Many electronic gaming systems use the status of an associated computer system to generate the random seed value (e.g., such as the date and/or time as in the above example). This method of seed generation is somewhat prone to repetition, and could possibly allow a very savvy player to identify a pattern in the outcomes of the gaming devices. To make the outcomes more random and to prevent any identifiable patterns from developing, it is important to make the inputted seeds as unpredictable as possible. The more varied the seeds, the more likely that the random numbers generated and thus the outcomes of the games will be varied.

Accordingly, there is a general need in the industry to provide more variance of seeds to make the random numbers generated (as well as outcomes of games resulting therefrom) more random.

SUMMARY

The present disclosure relates generally to gaming systems, gaming devices, and methods which utilize a random number generator, wherein the gaming system enables the player to participate in the process of selecting one or more seeds for the random number generator. The gaming system disclosed herein enables the player to pick one of a plurality of different displayed sources of data (or indications thereof) which the gaming system will use to generate one or more seeds which are used by the random number generator to generate numbers, which at least in part determine the outcomes displayed to the player, and thus the awards provided to the player.

In various embodiments, the gaming system gathers data from a plurality of different seeding sources not controlled by the gaming system. The gaming system uses the gathered data from each different seeding source to create different seeds. The gaming system displays an indication of each of the seeding sources and enables a player to pick one of the seeding sources to determine which seeds will be used. The gaming system uses the determined seeds for the random number generator to generate one or more numbers. Once produced, the generated numbers at least in part determine the outcome of the gaming system.

More specifically, in one embodiment, the gaming system includes a central server configured to communicate with at least one associated gaming device and at least one seed source server. The seed source server obtains data (e.g., the temperature in Rome, the temperature in Sydney, and the temperature in Anchorage) from a plurality of external seeding sources not controlled by the gaming system. To obtain this data, the seed source server accesses one or more reliable external sources containing information on current weather conditions (e.g., the World Weather Information Service or the Italian Air Force National Meteorological Service). The seed source server regularly obtains updates from the external seeding sources as the data changes. For example, if the temperature in Rome was 71.75 degrees Fahrenheit, and it changes to 72.35 degrees Fahrenheit, the seed source server updates that data when the change is obtained from the external seeding source. The seed source server sends the data from the plurality of sources through a secure network firewall to the central server.

After receiving the data from the seed server, the central server notifies the gaming device of seeding sources to display for selection by the player. For example, if the central server obtained data associated with the "Temperature in Anchorage," "Temperature in Rome" and "Temperature in Sydney," the central server communicates data regarding those three seed sources to the gaming device for display and selection by the player. The gaming device displays a plurality of selections, where each selection is associated with one of the different seeding sources. The gaming device enables a player to pick one of the plurality of displayed selections. The gaming device identifies the seeding source associated with the selection picked and communicates the player selected seeding source to the central server. The central server determines one or more seeds using the data received from the seed source server which corresponds to the seeding source selected by the player. For example, if the player chose the selection "Current Temperature in Rome," the gaming device notifies the central server of the player's identified seeding source and the central server uses the associated data (i.e., the temperature in Rome) from the seeding source to determine one or more seeds to send to the gaming device.

The gaming device inputs the seed or seeds received from the central server into a random number generator (and thus the random number generator algorithm) to generate one or more numbers. The gaming system uses the generated numbers to at least in part to determine the outcome of the game.

It should be appreciated that in one embodiment, the gaming system performs this process for each play of a primary game or secondary game. In other embodiments, the gaming system performs this process for a gaming session for a player. In one such embodiment, the player need only select the seeding source once for a plurality of primary or secondary game plays in a gaming session. In this embodiment, the seeding source selected is used to determine a seed for input in a random number generator, which regularly generates numbers for a gaming session. It should also be appreciated that the in certain embodiments, the gaming system enables the player to change the seeding source during a gaming session for one or plays of a primary game or a secondary game.

Additional features and advantages are described in, and will be apparent from, the following Detailed Description and the figures.

BRIEF DESCRIPTION OF THE FIGURES

FIG. 6C is a schematic diagram of another embodiment of the gaming system of the present disclosure.

FIG. 9 is a chart listing example seeding source data gathered for one embodiment of the gaming system of the present disclosure.

DETAILED DESCRIPTION

The present disclosure may be implemented in various configurations for gaming machines, gaming devices, or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system wherein the computerized instructions for controlling any games (which are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
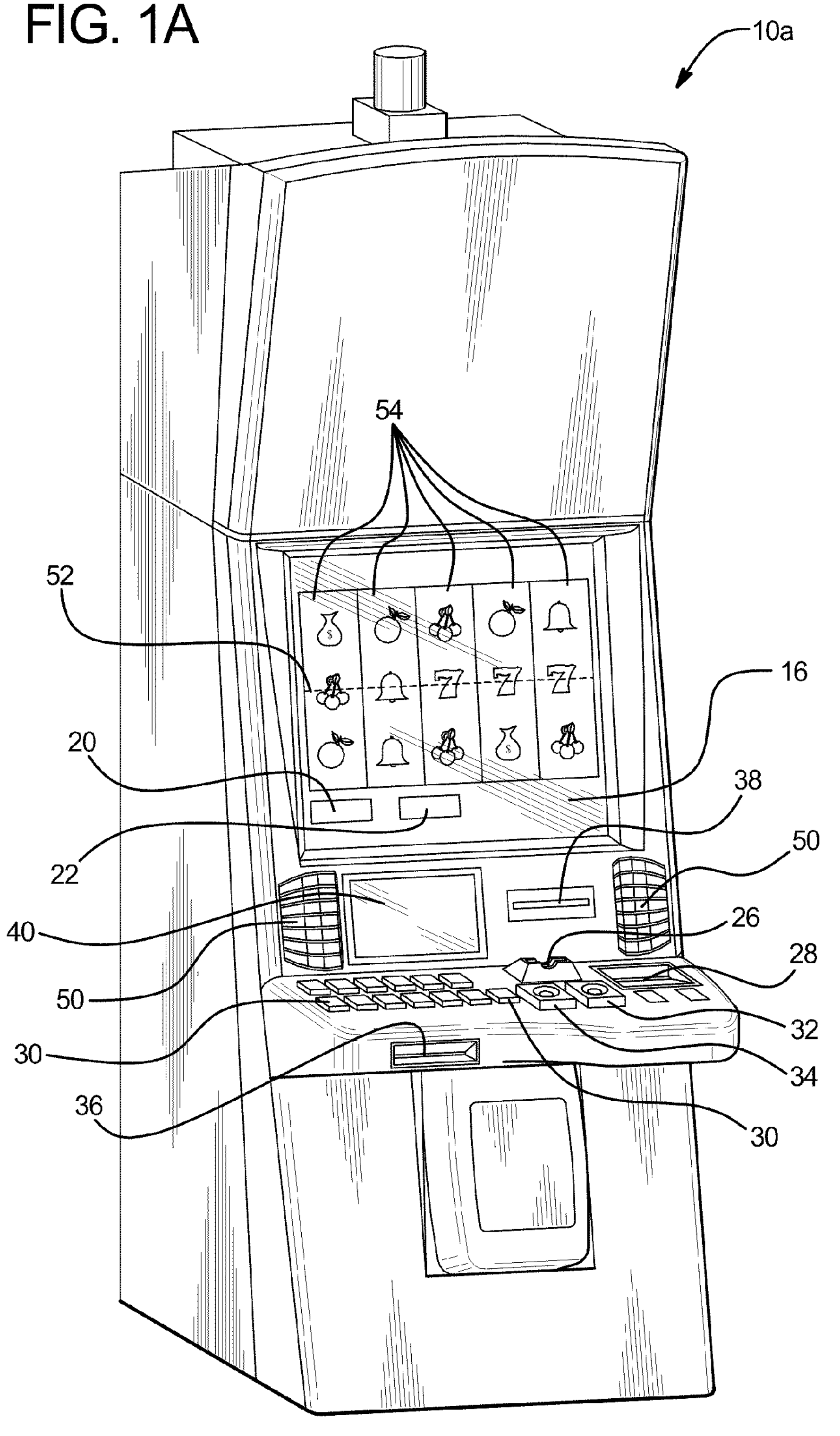
FIGS. 1A and 1B are perspective views of example alternative embodiments of the gaming device of the present disclosure.
Figure 1B:
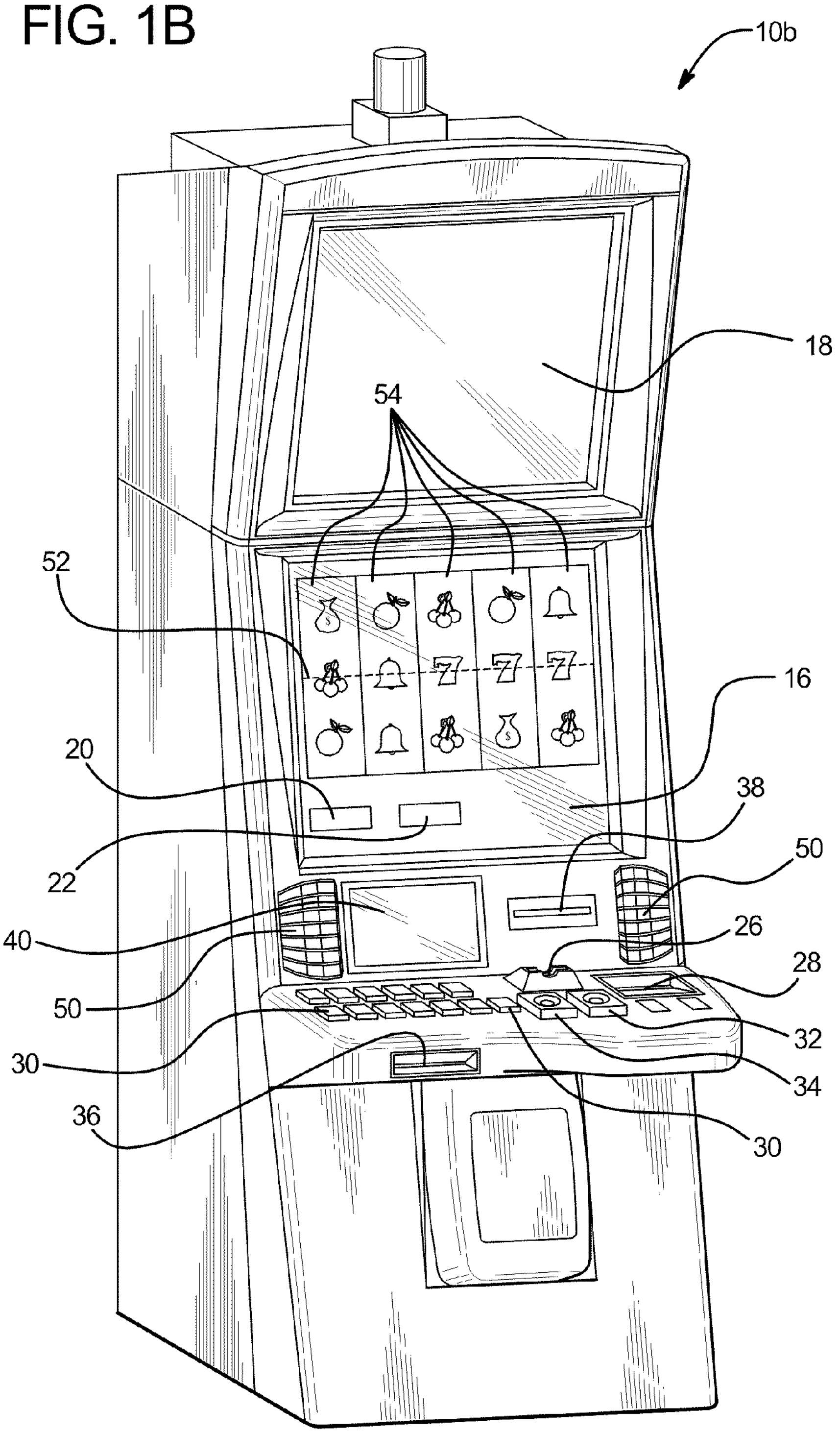

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet which provides support for a plurality of displays, inputs, controls, and other features of a conventional gaming machine. It is configured so that a player can operate it while standing or sitting. The gaming device can be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
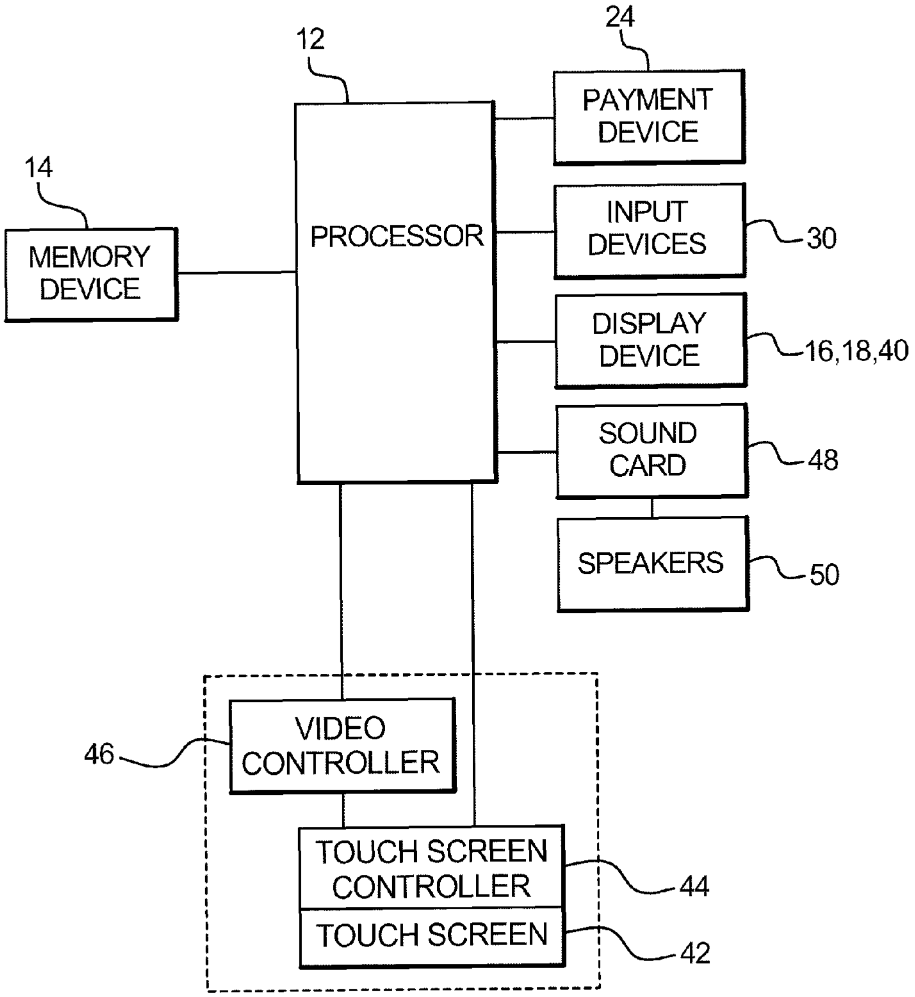
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which can include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device. In other embodiments, part or all of the program code and/or operating data described above can be downloaded to the memory device through a suitable network.

In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

It should be appreciated that in various embodiments, the random numbers are determined through utilization of one or more random number generators, such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance, or the equivalent. In one embodiment, the gaming device includes a bet display 22 which displays a player's amount wagered. In one embodiment, as described in more detail below, the gaming device includes a player tracking display 40 which displays information regarding a player's play tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket, or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip, a coded magnetic strip or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, which communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B, and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as seen in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player can make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as by playing music for the primary and/or secondary game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor), that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera as well as to display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering game as the primary or base game. The gaming machine or device may include some or all of the features of conventional gaming machines or devices. The primary or base game may comprise any suitable reel-type game, card game, cascading or falling symbol game, number game, or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, displays the plurality of simulated video reels 54. Each reel 54 displays a plurality of indicia or symbols, such as bells, hearts, fruits, numbers, letters, bars, or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more than one or all of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols.

This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the number of credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, a base or primary game may be a keno game wherein the gaming device displays a plurality of selectable indicia or numbers on at least one of the display devices. In this embodiment, the player selects at least one bit potentially a plurality of the selectable indicia or numbers via an input device such as a touch screen. The gaming device then displays a series of drawn numbers and determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or in a bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game, and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition occurs based on exceeding a certain amount of game play (such as number of games, number of credits, amount of time), or reaching a specified number of points earned during game play.

In another embodiment, the gaming device processor 12 or central controller 56 randomly provides the player one or more plays of one or more secondary games. In one such embodiment, the gaming device does not provide any apparent reason to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy-in for a bonus game is needed. That is, a player may not purchase entry into a bonus game; rather they must win or earn entry through play of the primary game, thus encouraging play of the primary game. In another embodiment, qualification of the bonus or secondary game is accomplished through a simple "buy-in" by the player—for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
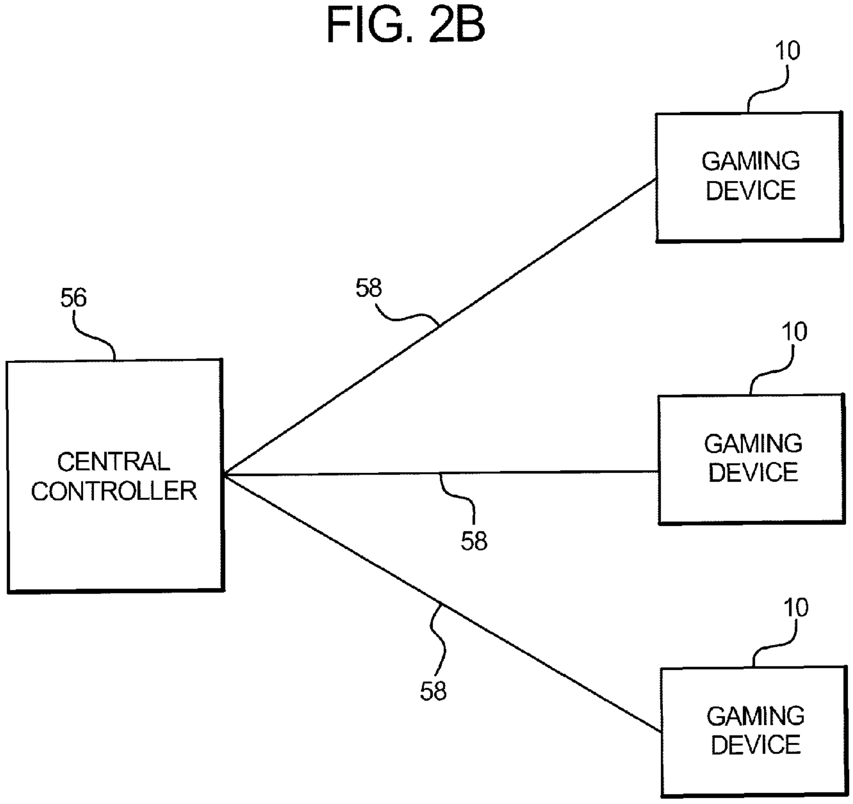
FIG. 2B is a schematic block diagram of one embodiment of a network configuration of a plurality of gaming devices disclosed herein.

In one embodiment, as illustrated in FIG. 2B, one or more of the gaming devices 10 are in communication with each other and/or at least one central controller 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more or each of the functions of the central controller, central server or remote host as disclosed herein may be performed by one or more gaming device processors. It should be further appreciated that one, more or each of the functions of one or more gaming device processors as disclosed herein may be performed by the central controller, central server or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno or lottery game is not displayed to the player, but the results of the bingo, keno, or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game, and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Player Selected Seeding Source Example Embodiments

Figure 3:
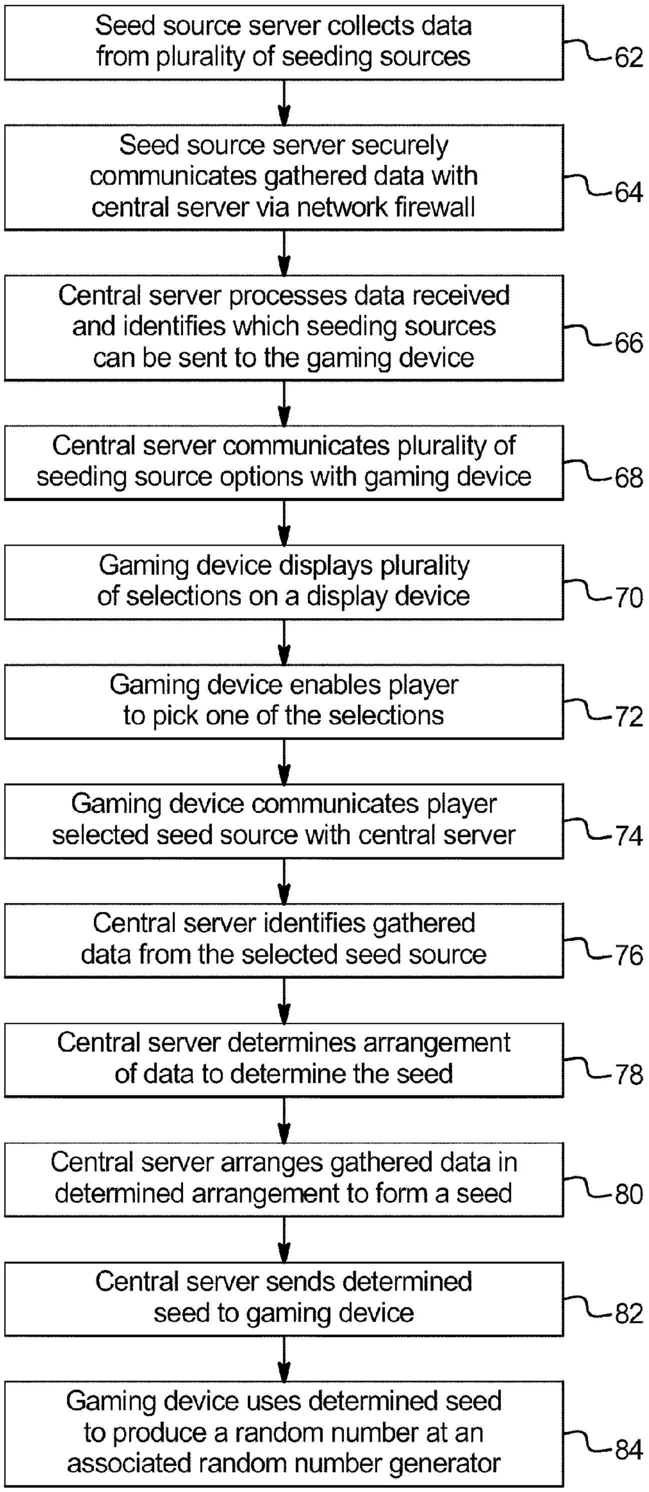
FIG. 3 is a flow chart of the steps of one embodiment of the present disclosure.
Figure 4:
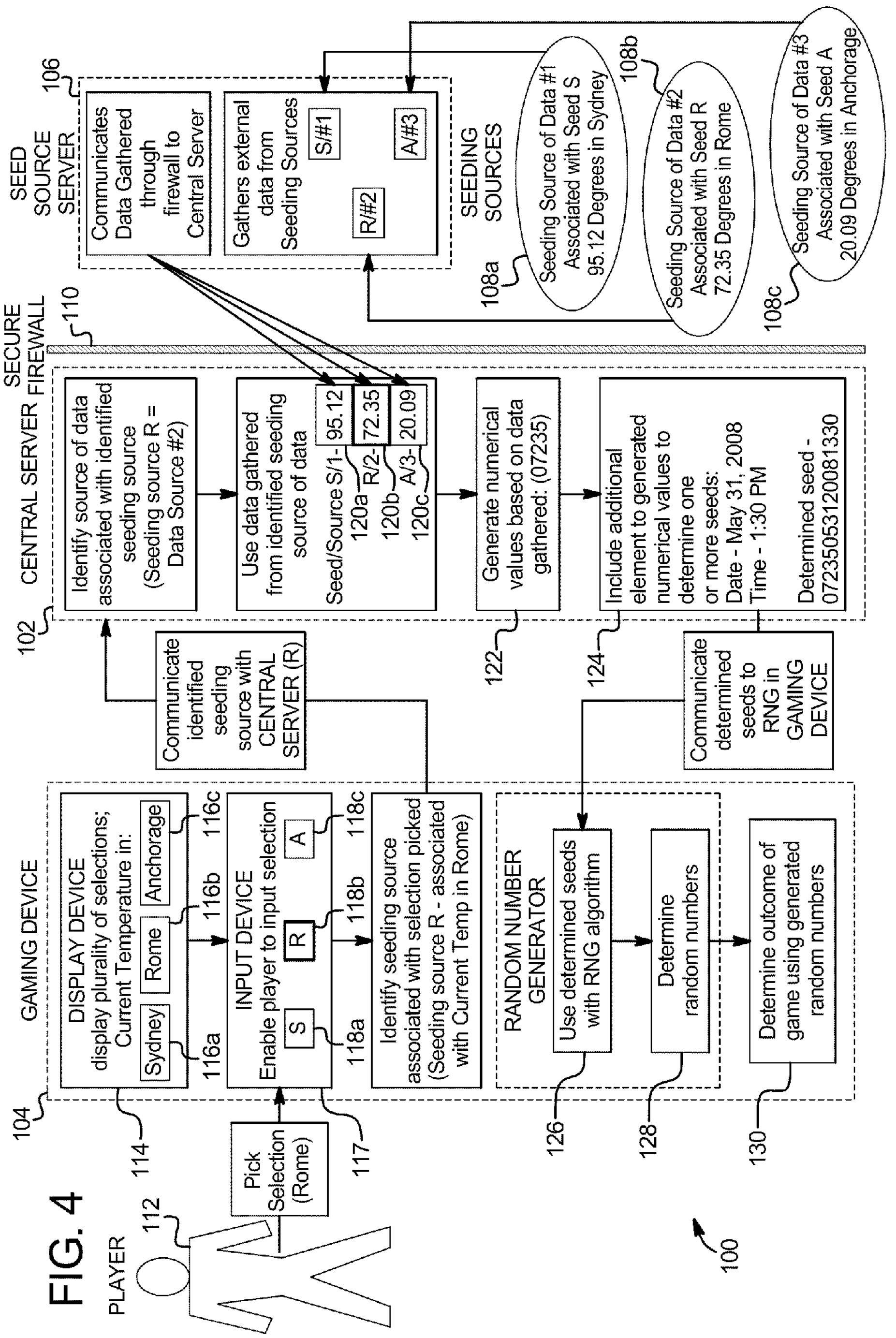
FIG. 4 is a schematic diagram of one embodiment of the gaming system of the present disclosure.

Referring now to FIGS. 3 and 4, one embodiment of the method of the present disclosure is illustrated, and generally indicated by numeral 60. In this embodiment, the gaming system 100 includes a central server 102 configured to communicate with one or more gaming devices 104 and at least one seed source server 106. The seed source server 106 gathers data from a plurality of different seeding sources 108*a*, 108*b*, and 108*c* not controlled by the gaming system as indicated by block 62. In one such embodiment, the seed source server 106 regularly obtains updates from each of the external seeding sources 108*a*, 108*b*, and 108*c* as the data changes as further discussed below in more detail. The seed source server 106 communicates the data gathered from the different seeding sources to the central server 102 through a secure network firewall 110 as indicated by block 64. The central server 102 processes the data received from the seed source server 106 and identifies which seeding sources or identifications thereof can be sent to the gaming device 104 as indicated by block 66. The central server 102 sends the gaming device 104 data regarding which available seeding sources can be displayed to and selected by the player 112 as indicated by block 68. It should be appreciated that the central server preferably first verifies that it has the data or can obtain the data from a seed source before identifying or displaying to the player that the seed source is selectable.

In the illustrated embodiment, at the beginning of a gaming session for a player 112, the gaming device 104 asks the player to select one of the available seeding sources for the gaming system to use to determine one or more seeds which will determine the outcome for one or more games of the gaming session. The gaming device 104 displays a plurality of selections 116*a*, 116*b*, and 116*c* on an associated display device 114 as indicated by block 70. The selections 116*a*, 116*b*, and 116*c* are each association with one of the different seeding sources of data 108*a*, 108*b*, and 108*c* accessible by the seed source server 106. The gaming device 104 enables a player 112 to pick one of the plurality of displayed selections through a suitable associated input device 117 as indicated by block 72. The gaming device 104 identifies the seeding source 118*a*, 118*b*, or 118*c* associated with the selection picked 116*a*, 116*b*, or 116*c* and communicates the identified seeding source with the central server 102 as indicated by block 74.

The central server 102 identifies the gathered data 120*a*, 120*b*, or 120*c* associated with the player selected seeding source 118*a*, 118*b*, or 118*c* as indicated by block 76. The central server 102 determines in what order the seeding source data will be arranged as indicated by block 78, and converts the data from the selected seeding source into one or more seeds according to determined arrangement as indicated by block 80. The central server 102 communicates the determined seed or seeds 124 to the gaming device 104 as indicated by block 82. The gaming device uses the determined seed(s) 124 as inputs for a random number generator 126 to produce a generated number(s) 128 as indicated by block 84. The gaming device uses the generated numbers at least in part to determine an outcome 130.

Figure 5:
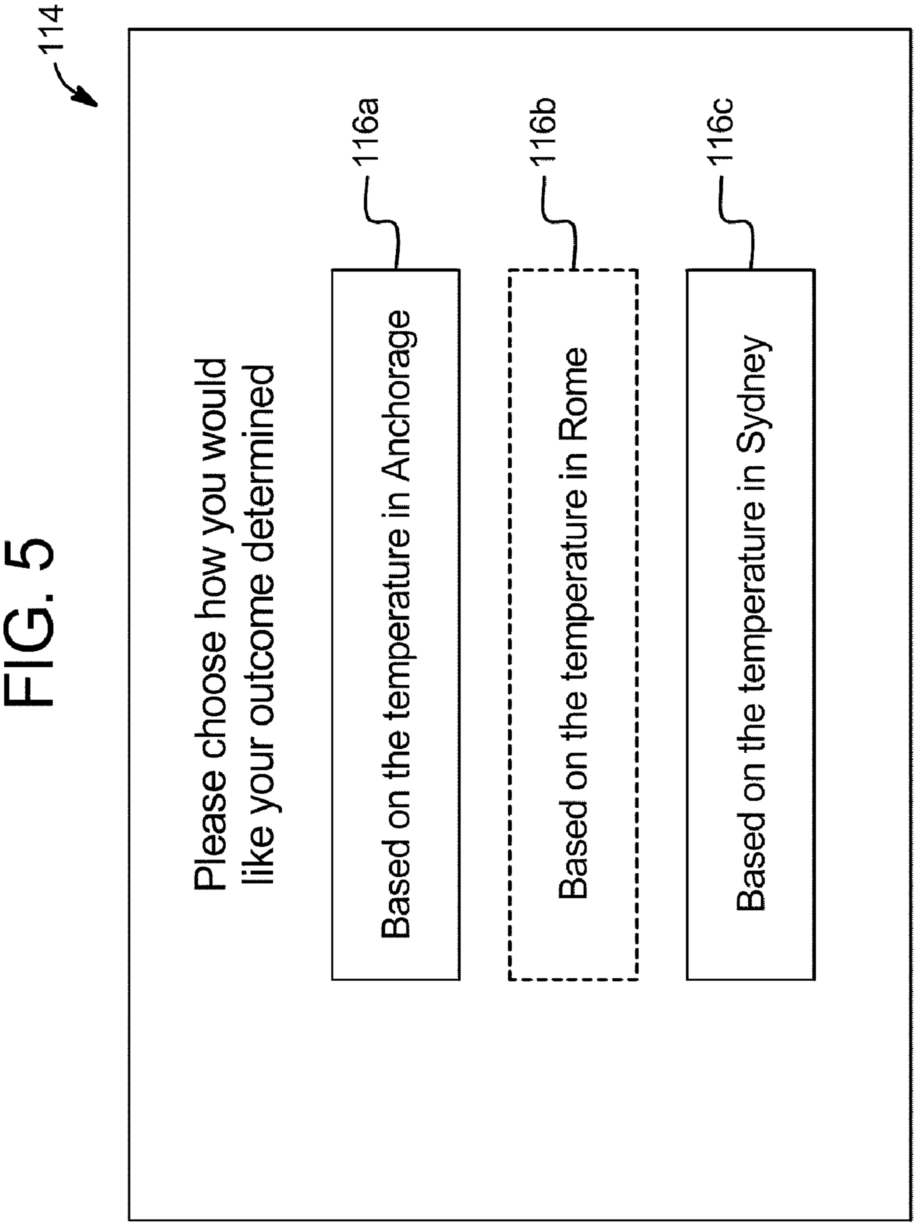
FIG. 5 is front view of an example display screen of one embodiment of the gaming system of the present disclosure.

Referring now to FIG. 4 and also FIG. 5, one embodiment of the gaming system of the present disclosure is illustrated. The seed source server 106 accesses data from three different external seeding sources to obtain: the temperature in Sydney 108*a*, the temperature in Rome 108*b*, and the temperature in Anchorage 108*c*. The seed source server 106 communicates the gathered temperatures of Sydney (95.12 degrees Fahrenheit) 120*a*, Rome (72.35 degrees Fahrenheit) 120*b*, and Anchorage (20.09 degrees Fahrenheit) 120*c* to the central server 102. In this example embodiment, after the central server 102 has this information, the central server 102 notifies the gaming device 104 that the seeding sources to be displayed to the player 112 include the temperature in Anchorage 108*a*, the temperature in Rome 108*b*, and the temperature in Sydney 108*c*.

In this embodiment, the display device 114 of the gaming device 104 is illustrated in greater detail in FIG. 5. The display device 114 displays the selections "Current Temperature in Sydney" 116*a*, "Current Temperature in Rome" 116*b* and "Current Temperature in Anchorage" 116*c*. The gaming device 104 enables the player 112 to pick the "Current Temperature in Sydney" 116*a*, the "Current Temperature in Rome" 116*b*, or the "Current Temperature in Anchorage" 116*c* through an associated input device 117. The gaming device 104 identifies the seed source associated with each selection displayed 116*a*, 116*b*, and 116*c*. For example, the selection "Current Temperature in Sydney" 116*a* is associated with seed source "S" 118*a*. The selection "Current Temperature in Rome" 116*b* is associated with seed source "R" 118*b*. The selection "Current Temperature in Anchorage" 116*c* is associated with seed source "A" 118*c*. The player 112 chose the selection "Current Temperature in Rome" 116*b*, and the gaming device identified the associated seed source "R" 118*b*.

The gaming device 104 communicates the identified seed source associated with the selection picked (i.e., seed source "R" 118*b* associated with the selection "Current Temperature in Rome" 116*b*) with the central server 102 as illustrated in FIG. 4. The central server identifies Seeding Source of Data #2 108*b* associated with the player-selected seed source "R" 118*b*. The central server 102 identifies the gathered data from Seeding Source of Data #2 108*b* as 72.35 degrees Fahrenheit 120*b*, representing the current temperature in Rome.

In this illustrated embodiment, the central server 102 converts the data from the seeding source to a seed by generating a plurality of numerals 122 based on the current data 120*b* from the identified Seeding Source of Data #2 108*b*. For example, the central server uses the gathered data of 72.35 degrees Fahrenheit and includes the date and time of day represented in a numeral (e.g., with the temperature in Rome 72.35 degrees Fahrenheit, and the date and time May 31, 2008, 1:30 PM, resulting in the numeral: 07235053120081330). The resulting string of numerals 124 comprises the determined seed, and the central server communicates the determined seed 124 back to the gaming device 104. It should be appreciated that the central server can use any suitable process to convert the data into one or more seeds.

The gaming device 104 uses the determined seed "07235053120081330" 124 as an input for the random number generator 126, which generates numbers 128. The gaming device then uses the generated numbers 128 to at least in part determine an outcome 130. The gaming device displays the outcome to the player and evaluates the displayed outcome. If the outcome 130 is a winning outcome, the gaming device 104 displays and provides an award to the player 112.

As discussed above, in one embodiment, the external seeding sources are not controlled by the gaming system. In this embodiment, the seeding sources are not affected by the any functionality of the gaming system, such as the status or properties of any part of the gaming system. The seeding source can be any suitable seeding source not controlled by the gaming system. For example, the seeding sources can include external sources of weather conditions (such as from the World Weather Information Service found at the web address www.worldweather.org), news headlines (such as from the Associated Press news wire found at the web address www.ap.org), radio station programming (such as the current song being played on a satellite radio station), or sports scores (such as from the Entertainment and Sports Programming Network found at the web address www.espn.com). In these embodiments, the seeding sources are accessible to the seed source server via the Internet; however, it should be appreciated that the seed sources could be other suitable sources. It should be appreciated that these sources are independent of any part of the gaming system.

In one embodiment, the data from one or more seeding sources is numerical in form. In the example of weather data or sports score data, the data typically originates in numerical form. The central server of one such embodiment is configured to manipulate the numerals to form one or more seeds. In one embodiment, the central server is configured to include one or more additional elements or numerals with the seed source data to form one or more seeds. For example, the central server could include one or more elements in addition to the seed source data (such as the current date and time represented numerically) to form one or more seeds.

It should be appreciated that in the examples of seed sources such as current news headlines, the data (on a surface level) from one or more seeding sources is in alphabetical form. However, it should be appreciated that such data (on a lower level or computer level) is also in numerical form. In such embodiments, the central server can use the numeral form or alternatively could use the alphabetical form and assign numerals to the letters and words to form numerical strings comprising one or more seeds. For example, the central server could replace each letter with the number representing that letter's position in the alphabet (e.g., the word "PRIZE" would take the numerical form "16189265" because P is the 16th letter in the alphabet, R is the 18th letter in the alphabet, I is the 9th letter in the alphabet, Z is the 26th letter in the alphabet, and E is the 5th letter in the alphabet). The central server of this embodiment could be configured to operate a multitude of different assigning conventions or methods to accomplish the task of turning non-numerical data into numerals or using the pure numerical data. In one embodiment, the central server could include one or more elements in addition to the seed source data (such as the current date and time represented numerically) to form one or more seeds.

It should be appreciated that a single seed could be comprised of multiple individual pieces of data from separate seeding sources. In one embodiment, the gaming system receives a plurality of individual pieces of data, which it strings together to form one seed. In one embodiment, the plurality of different individual pieces of data originate from the same seeding source. In another embodiment, the plurality of different individual pieces of data originate from different seeding sources. For example, one seed could be comprised of a numerical string of the temperatures of a plurality of cities in Africa accessible from one or more seeding sources (i.e., the temperatures of all the plurality of African cites could originate from the same source or the temperatures of each of the cities could be individually accessible from separate seeding sources).

Figure 7:
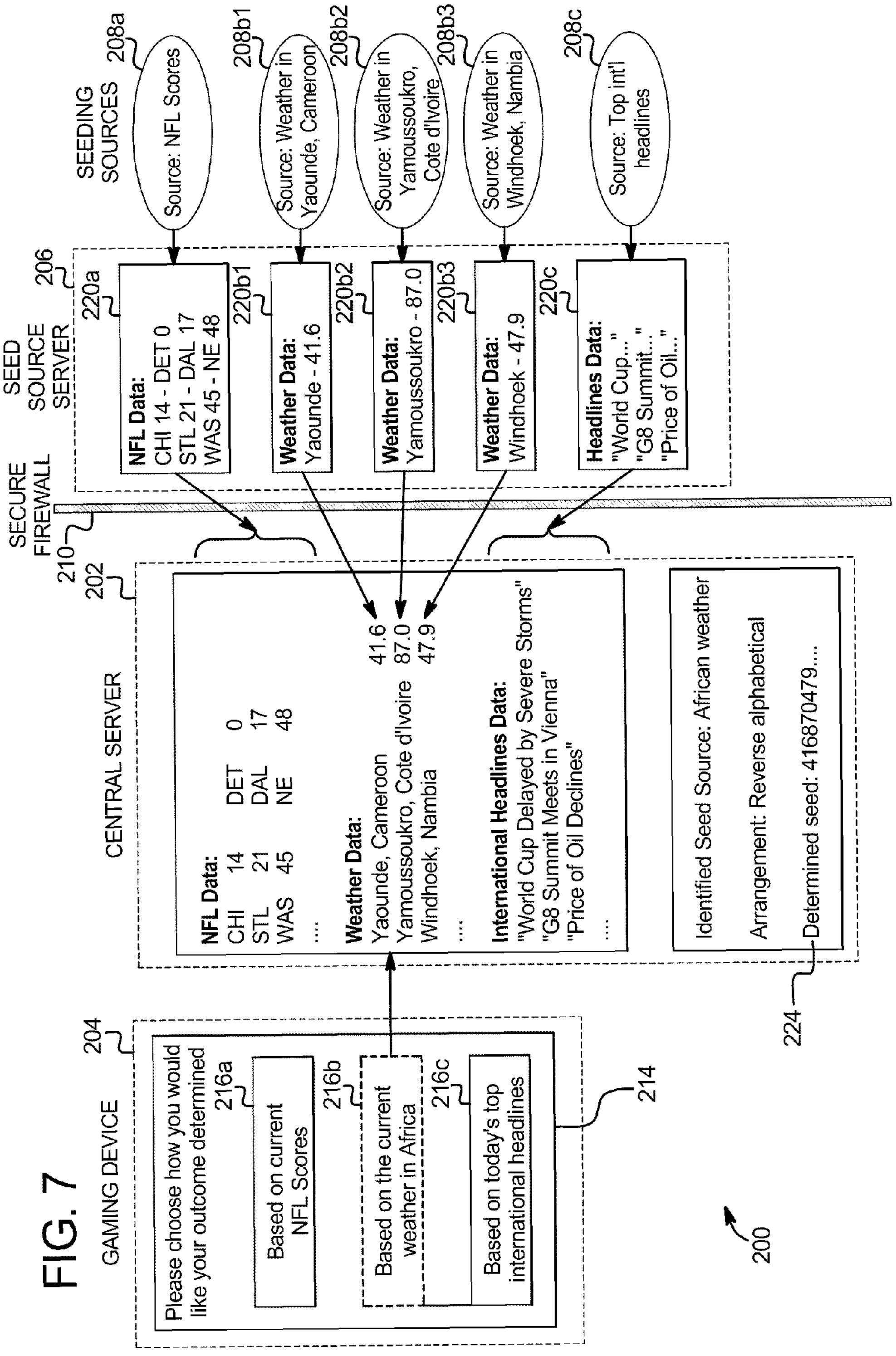
FIG. 7 is a schematic diagram of another embodiment of the gaming system of the present disclosure.
Figure 8:
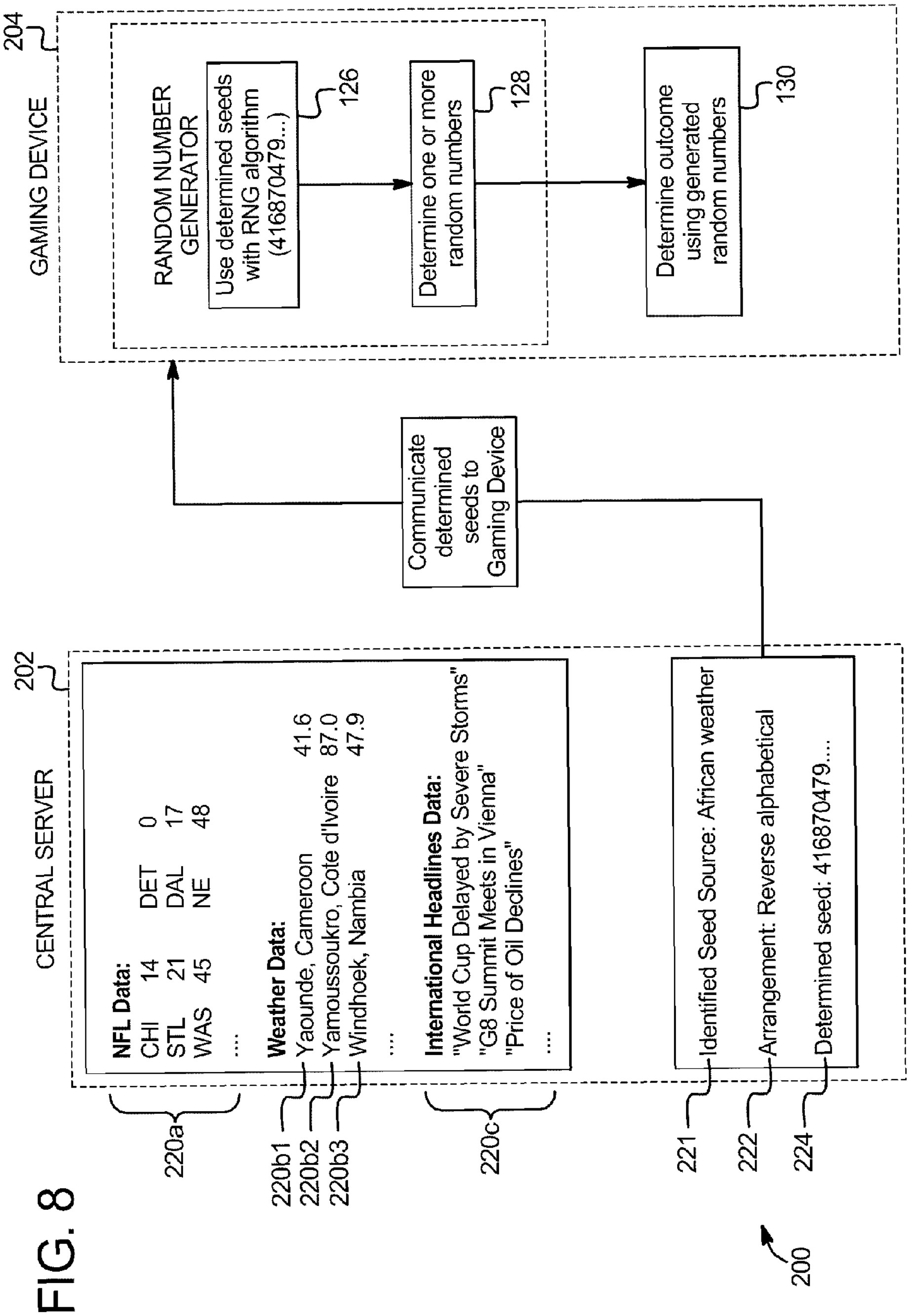
FIG. 8 is a schematic diagram of another embodiment of the gaming system of the present disclosure.

Referring now to FIGS. 7, 8, and 9, an example embodiment of a gaming system 200 using different types of data from an external seeding source is illustrated. The seed source server 206 accesses external seeding sources having data related to current NFL scores 208*a*, the temperature in a plurality of African cities 208*b*1, 208*b*2, and 208*b*3, and current top international news headlines 208*c*.

In the illustrated embodiment, the gathered data used to determine one or more seeds for each seeding source is comprised of multiple individual pieces of data. For example, the data used to determine the seed from the NFL seeding source 208*a* includes the scores of a plurality of pending professional football games (i.e., Chicago 14 vs. Detroit 0 220*a*1, St. Louis 21 vs. Dallas 17 220*a*2, and Washington 45 vs. New England 48 220*a*3). In one embodiment, the gaming system uses the scores of sports games as seeding data. In another embodiment, the gaming system could also use game status information, names of participants, or associated statistics of sports games as seeding data. In the illustrated embodiment, the data used to determine the seed from the NFL seeding source 208*a* originates from one external seeding source. In another embodiment, the data used to determine the seed from the NFL seeding selection could originate from a plurality of individual reliable external seeding sources.

In the illustrated embodiment, the data used to determine the seed associated with the selection: "Current Weather in Africa" 216*b* is gathered from three seeding sources 208*b*1, 208*b*2, and 208*b*3. These seeding sources each contain different data related to the temperature of various African cities (i.e., Yaounde, Cameroon 41.6 degrees Fahrenheit 220*b*1, Yamoussoukro, Cote d'lvoire 87.0 degrees Fahrenheit 220*b*2, and Windhoek, Nambia 47.9 degrees Fahrenheit 220*b*3). The seed source server 206 gathers each city's temperature from an individual external seed source (i.e., Yaounde from source 208*b*1, Yamoussourkro, Cote d'lvoire from source 208*b*2, and Windhoek, Nambia from source 208*b*3). In one embodiment, each city's temperature could originate from one external seeding source.

In the illustrated embodiment, the seeding source server 206 shares the gathered data from each African city 208*b*1, 208*b*2, and 208*b*3 with the central server 202 through a secure network firewall 210. Referring now to the chart in FIG. 9, a listing of seeding source data representing the weather in a plurality of different African countries is illustrated. The chart in FIG. 9 is an example of the type of listing of gathered seed source data that the central server receives from the seed source server and maintains for each seeding source. It should be appreciated that in various embodiments, the seeding source server could store and maintain this listing of gathered seed source data.

In the illustrated embodiment as shown in FIG. 7, the player is provided three seeding source selections on a display device 214 at the gaming device 204: "Current NFL Scores" 216*a*; "Current Weather in Africa" 216*b*; and "Today's Top International Headlines" 216*c*. The player selected "Current Weather in Africa" 216*b* as the identified seed source. As illustrated in more detail in FIG. 8, the central server 202 identifies the data corresponding to the player selected seed source 221 and determines in which arrangement to organize the data 222 to determine one or more seeds 224. The central server arranges the temperatures of the African cities (as listed in FIG. 9) in reverse alphabetical order 222 according to city name to determine one or more seeds (i.e., the temperature in Yaounde, Cameroon is 41.6 degrees Fahrenheit 220*b*1, the temperature in Yamoussoukro, Cote 'dlvoire is 87.0 degrees Fahrenheit 220*b*2, and the temperature in Windhoek, Nambia is 47.9 degrees Fahrenheit 220*b*3, etc., making a determined seed: 416870479 . . . ) 224. The central server of this embodiment could be configured to operate a multitude of different arranging conventions or methods to accomplish the task of organizing the multiple individual pieces of data to form one or more seeds which are associated with a single player selected seed source.

In the illustrated embodiment, the central server 202 sends the determined seeds 224 (i.e., "416870479 . . . ") to the gaming device 204. The gaming device 204 uses the determined seeds 224 with a random number generator 226 to generate one or more numbers 228. The gaming device 204 uses the generated numbers 228 to at least in part determine an outcome 230.

In one embodiment, the central server could use the gathered data corresponding to less than all of the accessible individual seeding sources to determine one or more seeds (i.e., the central server could use the temperature of more than one but not all listed African cities to generate one or more seeds in the illustrated embodiment). In this embodiment, the central server can use any suitable method or convention to choose which individual seeding sources to use to determine one or more seeds. In another embodiment, the central server could use the gathered data from all of the accessible individual seeding sources cities to determine one or more seeds (i.e., the temperature of all listed African cities could be used to generate one or more seeds in the illustrated embodiment).

In one alternative embodiment, the gaming device is configured to request a seed from the central server. The central server contacts the seeding source server for a seed corresponding to the request from the gaming device. The seed source server checks the external seeding source for updated information relating to the seed requested (i.e., seed source server could check into the temperature of all capital cities in Africa). In one such embodiment, the seed source server determines an order of arranging the data obtained from the external seeding source. The seed source server arranges the data (i.e., African cities' temperatures) in the determined order, thereby determining a seed. The seed source server sends the determined seed to the central server, and the central server sends the determined seed to the gaming device. The gaming device uses the determined seed to generate one or more numbers.

In one alternative embodiment, the central server receives the external seeding source data from the seed source server and determines the order of its arrangement. In this embodiment, the central server arranges the data in the determined order, thereby determining a seed. In this embodiment, the central server sends the determined seed to the gaming device which uses the determined seed to generate one or more numbers.

It should be appreciated that the central server can place the seed source data in any suitable order to form the seeds. For example, the gaming system can determine all seed source data will be listed backwards to form the seed.

It should be appreciated that the seed source server can obtain the data at any suitable time periods. In one embodiment, the seed source server updates the seed source data in real time as it changes at the seed source. In another embodiment, the seed source server updates the seed source data at regular intervals. In another embodiment, the seed source server updates the seed source data after a certain period of time following its change at the seed source.

It should be appreciated that the seed source server can communicate with the central server in any suitable manner. In one embodiment, the seed source server communicates with the central server through a secure network firewall. In one embodiment, communication between the seed source server is constant. In another embodiment, the communication between the seed source server and the central server is periodic. In one embodiment, communication between the seed source server and central server occurs when the seeding sources update changes in the data. In another embodiment, communication between the seed source server and the central server is time delayed from the time the seeding sources update changes in the data.

Figure 6A:
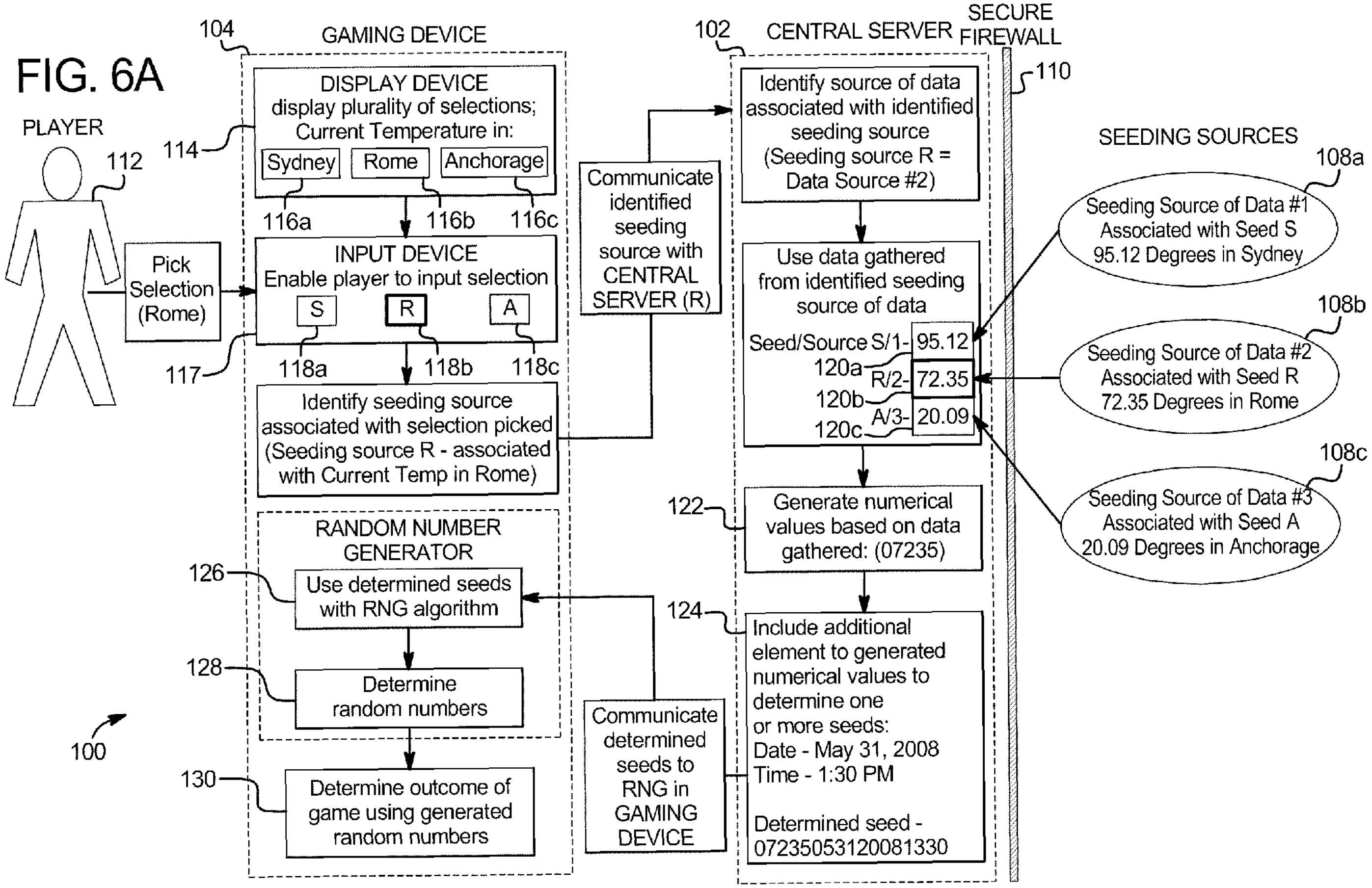
FIG. 6A is a schematic diagram of another embodiment of the gaming system of the present disclosure.

In one alternative embodiment as generally illustrated in FIG. 6A, the central server is configured to directly access the plurality of different seeding sources not controlled by the gaming system without accessing a seed source server. In this embodiment, the central server directly obtains data from each of the external seeding sources as the data changes. In one such embodiment, communication between the plurality of external seeding sources and the central server is filtered through a secure network firewall.

Figure 6B:
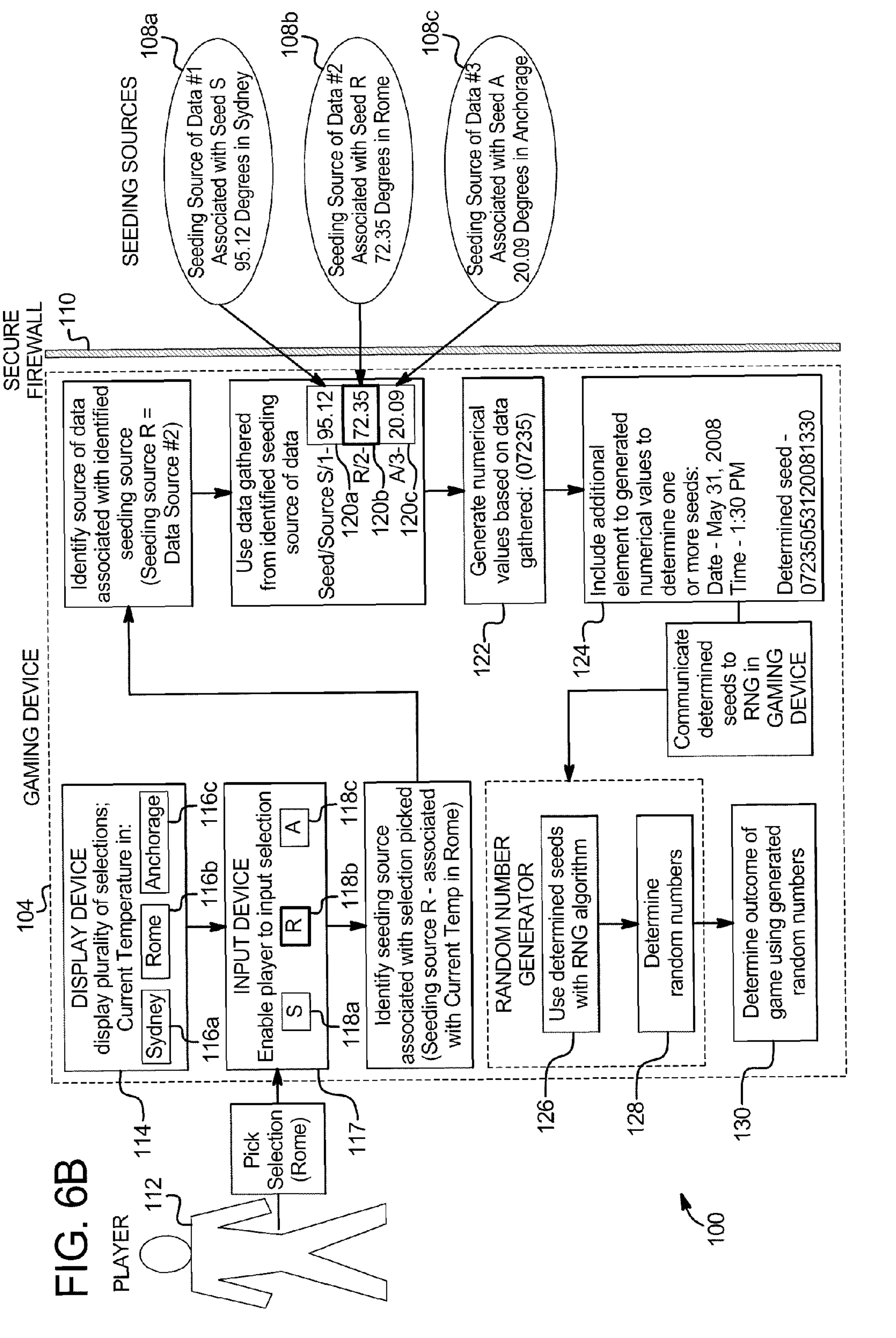
FIG. 6B is a schematic diagram of another embodiment of the gaming system of the present disclosure.

In another alternative embodiment as generally illustrated in FIG. 6B, the gaming device is configured to directly access the plurality of different seeding sources not controlled by the gaming system without accessing a seed source server or a central server. In one such embodiment, the gaming device obtains data from each of the external seeding sources as the data changes. In this embodiment, communication between the plurality of external seeding sources and the central server is filtered through a secure network firewall. In this embodiment, the gaming device is configured to determine one or more seeds using information gathered from the external seeding sources. In one such embodiment, it should be appreciated that all functionality of obtaining seeds and converting data is at the gaming device level.

In another alternative embodiment as generally illustrated in FIG. 6C, the gaming device is configured to operate directly with the seed source server without going through a central server. In one such embodiment, communication between the seed source server and the gaming device is filtered through a secure network firewall. In one such embodiment, the seed source server determines one or more seeds and communicates them to the gaming device. In another such embodiment, the gaming device determines one or more seeds using information gathered at the seed source server. In one such embodiment, it should be appreciated that all functionality of obtaining seeds and converting data is at the gaming device level. In another such embodiment, the functionality of obtaining seeds and converting data is at the seed source server level.

It should also be appreciated that the gaming system can generate seeds at various different times in various different embodiments. In one embodiment, the central server determines one or more seeds before it notifies the gaming device of the different available seeding sources for selection by a player. In another embodiment, the central server determines one or more seeds after the gaming device has notified the central server of which seeding source the player has selected.

In one embodiment, the central server sends one or more seeds to the gaming device before the start of a gaming session of a plurality of plays of the game. In another embodiment, the central server sends one or more seeds to the gaming device at the start of a gaming session. In another embodiment, the central server sends one or more seeds to the gaming device during a gaming session.

It should also be appreciated that in various embodiments, the gaming system can have one or more random number generators. In one embodiment, the central server does not have a random number generator, and the gaming device has one or more random number generators. In another embodiment, the central server and the gaming device each have one or more random number generators. In another embodiment, the central server has one or more random number generators and the gaming device does not have a random number generator. It should be appreciated that each random number generator used by the central server or gaming device can be any suitable random number generator. It should also be appreciated that the central server, gaming device, and any random number generators from various embodiments could generate one or more seeds and/or one or more numbers before a gaming session begins, at the start of a gaming session, or while a gaming session is pending.

In one embodiment, the gaming device has one or more random number generators and the central server does not have a random number generator. In this embodiment, the central server sends one or more determined seeds to the gaming device, which uses its first random number generator to determine a plurality of additional seeds. In one such embodiment, the gaming device uses a second random number generator to generate one or more numbers using the plurality of additional seeds determined at the first random number generator. In one embodiment, the second random number generator could generate one or more numbers by inputting the determined seeds sent by the central server.

In another embodiment, the central server has at least one random number generator and the gaming device has at least one random number generator. In this embodiment, the central server determines one or more seeds using the seeding source data associated with the player's selection as inputs for the random number generator. In one such embodiment, the central server sends the plurality of determined seeds to the gaming device at the beginning of the gaming session. In this embodiment, the gaming device uses a random number generator with the plurality of determined seeds from the central server to generate one or more numbers.

In another embodiment, the central server has one or more random number generators and the gaming device does not have a random number generator. In this embodiment, the central server determines one or more seeds using the seeding source data associated with the player's selection as inputs for a random number generator. In one such embodiment, the central server uses the one or more determined seeds with a first random number generator to produce one or more additional seeds. In one such embodiment, the central server uses the one or more additional seeds with a second random number generator to generate one or more numbers. In this embodiment, the central server sends the generated numbers to the gaming device.

It should be appreciated that the gaming device can present seeding source selections to the player either automatically, when a predetermined condition is met, or upon the player's request. In one embodiment, the gaming device provides the option of selecting a seeding source to the player. In various embodiments, the gaming device displays an available selection to the player that allows the player to opt out of choosing a seeding source (e.g., along with the selections "Current weather in Anchorage," "Current weather in Rome," and "Current weather in Sydney," the gaming device includes a selection, "I don't care"). In the event that the player opts not to choose a seeding selection (i.e., chooses the "I don't care" selection), the gaming system can choose a seed or seeding method automatically.

In one embodiment, the gaming device will automatically prompt the player with a plurality of seeding source selections at the beginning of each gaming session.

In different embodiments, the determination of whether or not the gaming device prompts the player to select a seeding source is predetermined, randomly determined, determined based on a player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the determination of whether or not the gaming device prompts the player to select a seeding source occurs based on a displayed event in a play of one or more displayed games of one or more of the gaming devices in the gaming system. In another embodiment, the determination of whether or not the gaming device prompts the player to select a seeding source occurs independent of any displayed event in any play of any game of any of the gaming devices in the gaming system. In another embodiment, the gaming system tracks the occurrences of one or more suitable events occurring at or in association with one or more players and/or one or more gaming devices in the gaming system and determines, based on these tracked events, whether the gaming device prompts the player to select a seeding source. In another embodiment, the gaming system defines one or more game play parameters, wherein each time a player's tracked game play activity satisfies the defined parameter, the gaming device prompts the player to select a seeding source.

In another embodiment, the gaming system will prompt the player with a plurality of seeding source selections based upon the player's request. In one such embodiment, the gaming device provides the player with an opportunity to change seeding sources in the middle of a gaming session (i.e., the gaming device has a selection that the player could choose in the middle of a gaming session, such as "Change Outcome Determination"). In one such embodiment, the gaming device provides the player with an opportunity to change seeding sources after a play of a game. The player could indicate a wish to change seeding sources in the middle of a gaming session with a suitable associated input device.

In another embodiment, the player can choose whether or not to exercise the option of selecting a seeding source at the beginning of a gaming session. For example, the gaming device displays an initial selection: "Would you like to determine how your outcome will be decided?" In one such embodiment, the gaming device will only provide selections for seeding sources to the player if the player indicates that he or she would like to have an input in how the outcome will be decided.

It should be appreciated that the central server notifies the gaming device of which seeding sources of data are available for display to and selection by the player. In one such embodiment, the central server notifies the gaming device of a list of potential seeding sources of which it has gathered associated data. In this embodiment, the gaming device chooses a plurality of seeding sources from the list provided by the central server to display for selection by the player. In another embodiment, the central server instructs the gaming device which seeding sources to display for selection by the player.

In one embodiment, the central server sends one or more determined seeds associated with each of the plurality of available seeding sources to the gaming system at the beginning of a gaming session. In this embodiment, the gaming device will already have the one or more seeds associated with each displayed selection before the player makes a selection. In one such embodiment, the seeds sent to the gaming device before a gaming session are available for immediate use with a random number generator. It should be appreciated that such a configuration would result in fewer required communications between the gaming device and the central server (i.e., rather than the gaming device notifying the central server of the selected seeding source and the central server determining one or more seeds before sending them back to the gaming device, the gaming device will already have the seeds available when the player selects a seeding source, so one or more extra communication steps are eliminated).

In one embodiment, the gaming system enables a player to play the game a plurality of times to comprise a gaming session. In one embodiment, the gaming system enables a player to choose a seeding source at the beginning of the gaming session. In one embodiment, a gaming session begins when a player first inserts money into the gaming device and ends when the player redeems any provided awards or stops playing the gaming device.

In one embodiment, the gaming system uses the same player selected seeding source to determine one or more seeds for a plurality of plays of the game in the gaming session. In one embodiment, the gaming device enables the player to make an alternative seeding source selection in the middle of a gaming session after a play of the game. The gaming device of this embodiment provides an option to change seeding sources at the display device, and enables a player to select the option to change seeding sources at the associated input device.

In one embodiment, a gaming session could include one or more primary games and/or one or more secondary games. In one such embodiment, the primary games could include wagering games and the secondary games could include a bonus games or rounds.

In one embodiment, if the gaming system uses the same seeding source in a subsequent play of the gaming session as in a previous play of the gaming session, the gaming system will cross-reference (i.e., compare to ensure the data is not identical) the gathered data used in the subsequent play with the gathered data used in the previous play to see if the associated seeing source data has changed. In this embodiment, if the data gathered from the associated seeding source is unchanged between the time of the previously and subsequently played games, the gaming system will modify the subsequent seed to prevent the seeds from being identical. For example, if at the beginning of a gaming session, the player chose a seeding source associated with the current temperature in Rome, and during a subsequent play within the gaming session which uses the same seeding source, the temperature in Rome is unchanged from a previous play, the gaming system will modify the second seed derived from the current temperature in Rome so it differs from the first seed.

In one embodiment, the gaming system will cross-reference the seeding source data of a current play of the game with the seeding source data of all previous plays of a gaming session. In another embodiment, the gaming system will cross-reference the seeding source data of a current play of the game with all previous plays of that gaming device within a given time period, whether or not all the plays were within one gaming session.

For example, referring to the illustrated embodiment of FIG. 3, if a player chose "Current Temperature in Rome" as his or her seeding source at the beginning of a gaming session, during subsequent plays of the gaming session, the gaming system will look to whether the temperature in Rome at the time of the subsequent play is different from the temperature in Rome at the time of any previous plays of the game. In the illustrated embodiment, if the gaming system determines that the temperature in Rome at the time of the subsequent play is still 72.35 degrees Fahrenheit, it will modify the data before determining a seed value in the subsequent play of the gaming session. Modifying the determined seed value before introducing it to a random number generator will help to prevent repetitious seed values and increased chance of outcome predictability. It should be appreciated that the gaming system can cross-check any modified or unmodified data or generated numbers to prevent duplicate seeds.

In one such embodiment, the central server modifies the duplicated gathered data by incorporating into the seed an additional element. In one embodiment, the central server incorporates a time element into the determined seed (e.g., if a player makes a duplicate selection of "Current Temperature in Rome" at 11:34.25 a.m., the central server will modify the seed "07235" to include the current time, and become "07235113425"). In one embodiment, the current date could also be implemented, as well as current local temperature, among other parameters. In one embodiment, the central server does not insert an additional element to the duplicated data numerals, but mixes up the order of conditions, thereby juxtaposing the numerals and making them unpredictable (e.g., the decimal values from the temperature in Rome could be moved the beginning of the number as it appears in the determined seed: 03572 rather than 07235 or the temperature in Rome is repeated in reverse to determine a seed: 0723553270). In one embodiment, the central server modifies the determined seed using an additional random number generator. It should be appreciated that the central server could be configured to operate a multitude of different arranging conventions or methods to accomplish the task of organizing the modifying the gathered data or seeds which are duplicates of gathered data or seeds from a previous play in the gaming session.

It should be appreciated that part of a seed could be based upon a player's input. For example, the gaming device could present a number pad or other suitable input device to the player, enabling the player to enter their favorite number(s), and these numbers would be used in part to determine one or more seeds.

In one embodiment, part of a seed could be based upon a player's digitized signature. For example, the gaming device of one embodiment presents a digitizing mechanism (i.e., the touch screen of the gaming device) to enable a player to "sign" the screen with his or her finger. In this embodiment, the computer could take the signature image and use it at least in part to determine one or more seeds. It should be appreciated that the various embodiments in which a player's input is used as a partial seed can be used with the plurality of embodiments discussed above to determine one or more seeds and generate one or more numbers.

It should be appreciated that various embodiments of the disclosure contained herein increase player enjoyment and excitement by giving the player the feeling that he or she has more of a sense of control over the outcome by participating in the selection of the seeding method. It should also be appreciated that the disclosure contained herein includes a process of determining random number generator seeds which gives the player the ability to impact the outcome while still keeping the outcome unpredictable.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. A gaming system comprising:

a gaming device having at least one input device and at least one display device; and a central server configured to operate with the gaming device to:

(a) obtain data from at least one external seeding source not controlled by the gaming system;

(b) display a plurality of selections, wherein each of the plurality of selections indicates at least one external seeding source, and each of the plurality of selections is associated with the respective external seeding source(s);

(c) enable a player to pick one of the plurality of selections to determine what data associated with the at least one external seeding source will be used to determine a seed for play of a game;

(d) use the determined seed as an input to a random number generator to generate at least one number for said play of the game;

(e) use the at least one generated number to determine an outcome for said play of the game;

(f) evaluate the outcome for any awards for said play of the game; and (g) provide any awards to the player for said play of the game.

2. The gaming system of claim 1, wherein the at least one external seeding source includes data related to naturally occurring phenomena.

3. The gaming system of claim 1, wherein the gaming device is configured to display the plurality of selections at the beginning of a gaming session which includes said play of the game.

4. The gaming system of claim 1, wherein the gaming device is configured to display a selection which enables a player to pick a new seeding source.

5. The gaming system of claim 1, wherein the central server is configured to determine said seed and send said seed to the gaming device.

6. The gaming system of claim 5, wherein the central server is configured to determine said seed by generating a plurality of numerical values based on the external seeding source data associated with the selection picked.

7. The gaming system of claim 1, wherein the central server is configured to use said determined seed as an input to the random number generator to generate said at least one number for said play of the game.

8. The gaming system of claim 5, wherein the central server is configured to determine said seed before the beginning of a gaming session including said play of the game.

9. The gaming system of claim 1, which includes a seed source server configured to provide the central server with the data from the at least one external seeding source.

10. The gaming system of claim 9, wherein the central server determines said seed by identifying the data obtained from the seed source server corresponding to the external seeding source associated with the selection picked.

11. The gaming system of claim 9, wherein the seed source server is configured to update the data obtained from the at least one external seeding source at different points selected from the group consisting of: as the data changes; in real time; periodically; or after a time delay.

12. The gaming system of claim 9, wherein the central server is configured to communicate to the gaming device the plurality of selections to be displayed to the player.

13. The gaming system of claim 12, wherein the plurality of selections to be displayed to the player is based upon which seeding sources are accessible by the seed source server.

14. The gaming system of claim 12, wherein the gaming device is configured to choose which selections to display from the plurality of selections communicated by the central server.

15. The gaming system of claim 12, wherein the central server is configured to communicate to the gaming device the plurality of selections to be displayed to the player before the beginning of a gaming session including said play of the game.

16. The gaming system of claim 12, wherein the central server is configured to communicate to the gaming device the plurality of selections to be displayed to the player when the gaming device communicates the identified seeding source to the central server.

17. The gaming system of claim 9, wherein the central server is configured to operate with at least one random number generator.

18. The gaming system of claim 17, wherein the central server is configured to determine the one or more seeds using the external seeding source data associated with the selection picked to input into a first of said at least one random number generators.

19. The gaming system of claim 18, wherein the central server is configured to send the one or more determined seeds to the gaming device when the gaming device communicates the identified seeding source to the central server.

20. The gaming system of claim 18, wherein the central server is configured to send the one or more determined seeds to the gaming device before the beginning of a gaming session including said play of the game.

21. The gaming system of claim 18, wherein the central server is configured to generate the one or more numbers using said determined one or more seeds to input into a second of said at least one random number generators.

22. The gaming system of claim 21, wherein the central server is configured to send the one or more generated numbers to the gaming device when the gaming device communicates the identified seeding source to the central server.

23. The gaming system of claim 21, wherein the central server is configured to send the one or more generated numbers to the gaming device before the beginning of a gaming session including said play of the game.

24. A gaming system comprising:

a gaming device having at least one input device and at least one display device;

a seed source server including a plurality of external seed sources each associated with a seed selection and corresponding to a requestable seed; and a central server configured to operate with the gaming device and the seed source server to:

(a) cause the gaming device to request a seed from the central server for a play of a game;

(b) contact the seed source server for the seed selection corresponding to the request for said play of the game;

(c) check an external seeding source associated with said seed corresponding to the request for data for said play of the game;

(d) determine an order of arranging the data obtained from the external seeding source for said play of the game;

(e) arrange the data in said determined order to determine a seed for said play of the game;

(f) use the determined seed to generate at least one number for said play of the game;

(g) use the at least one generated number to generate an outcome for said play of the game;

(h) evaluate the outcome for any awards for said play of the game; and (i) provide any awards to the player for said play of the game.

25. The gaming system of claim 24, wherein the gaming device is configured to request the seed from the central server.

26. The gaming system of claim 24, wherein the central server is configured to contact the seed source server for the seed corresponding to the request.

27. The gaming system of claim 24, wherein the seed source server is configured to check the external seeding source associated with said seed corresponding to the request for data.

28. The gaming system of claim 24, wherein the central server is configured to determine said order of arranging the data obtained from the external seeding source.

29. The gaming system of claim 24, wherein the central server is configured to arrange the data obtained from the external seeding source to determine said seed.

30. The gaming system of claim 24, wherein the seed source server is configured to determine said order of arranging the data obtained from the external seeding source.

31. The gaming system of claim 24, wherein the seed source server is configured to arrange the data obtained from the external seeding source to determine said seed.

32. The gaming system of claim 24, wherein the gaming device is configured to use the at least one generated number to generate said outcome for said play of the game.

* * * * *

UNITED STATES PATENT AND TRADEMARK OFFICE

CERTIFICATE OF CORRECTION

PATENT NO. : 8,226,467 B2
APPLICATION NO. : 12/269372
DATED : July 24, 2012
INVENTOR(S) : Reid M. Weber et al.

It is certified that error appears in the above-identified patent and that said Letters Patent is hereby corrected as shown below:

IN THE CLAIMS

In Claim 1, Column 29, Line 34, between “one” and “external” insert --of the at least one--.
In Claim 3, Column 29, Line 46, replace “the” with --a--.
In Claim 4, Column 29, Line 49, replace “a” with --the--.
In Claim 7, Column 29, Line 59, replace “an” with --the--.
In Claim 8, Column 29, Line 63, replace “the” with --a--.
In Claim 15, Column 30, Line 22, replace the second instance of “the” with --a--.
In Claim 16, Column 30, Line 28, replace “the” with --an--.
In Claim 18, Column 30, Line 34, delete “the”.
In Claim 18, Column 30, Line 37, replace “generators” with --generator--.
In Claim 19, Column 30, Line 41, replace the first instance of “the” with --an--.
In Claim 20, Column 30, Line 44, replace the second instance of “the” with --a--.
In Claim 21, Column 30, Line 47, replace “one or more numbers” with --at least one number--.
In Claim 21, Column 30, Line 49, replace “generators” with --generator--.
In Claim 22, Column 30, Line 51, replace “one or more” with --at least one--.
In Claim 22, Column 30, Lines 51 to 52, replace “numbers” with --number--.
In Claim 22, Column 30, Line 53, replace the first instance of “the” with --an--.
In Claim 23, Column 30, Line 55, replace “one or more” with --at least one--.
In Claim 23, Column 30, Lines 55 to 56, replace “numbers” with --number--.
In Claim 23, Column 30, Line 56, replace the second instance of “the” with --a--.

Signed and Sealed this
Twenty-second Day of January, 2013

David J. Kappos

David J. Kappos
*Director of the United States Patent and Trademark Office*